US012652471B2

(12) United States Patent (10) Patent No.: US 12,652,471 B2
Ishihara (45) Date of Patent: Jun. 9, 2026

(54) DETECTION DEVICE

(71) Applicant: Magnolia White Corporation, Tokyo (JP)

(72) Inventor: Tomoyuki Ishihara, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 73 days.

(21) Appl. No.: 18/752,045

(22) Filed: Jun. 24, 2024

(65) Prior Publication Data

US 2024/0430583 A1 Dec. 26, 2024

(30) Foreign Application Priority Data

Jun. 26, 2023 (JP) .................................. 2023-104117

(51) Int. Cl.
| | |
|---|---|
| *H04N 23/74* | (2023.01) |
| *H04N 23/56* | (2023.01) |
| *H04N 23/76* | (2023.01) |
| *H04N 23/84* | (2023.01) |
| *G06V 20/69* | (2022.01) |

(52) U.S. Cl.
CPC ............. *H04N 23/84* (2023.01); *H04N 23/74* (2023.01); *H04N 23/76* (2023.01); *G06V 20/69* (2022.01); *H04N 23/56* (2023.01)

(58) Field of Classification Search
CPC ...... H04N 23/56; H04N 23/74; H04N 23/743; G01N 2021/1776
USPC ....................................................... 348/229.1
See application file for complete search history.

(56) References Cited

U.S. PATENT DOCUMENTS

| | | | | |
|---|---|---|---|---|
| 2002/0191834 | A1* | 12/2002 | Fishbaine .............. | H04N 25/72 |
| | | | | 382/150 |
| 2012/0127336 | A1* | 5/2012 | Uezono .................. | H04N 23/88 |
| | | | | 348/E9.051 |
| 2016/0027206 | A1* | 1/2016 | Beach .................... | G02B 21/10 |
| | | | | 382/128 |
| 2016/0341947 | A1* | 11/2016 | Sato ...................... | G02B 21/086 |
| 2018/0167542 | A1* | 6/2018 | Minden ................... | G03B 7/08 |
| 2019/0034755 | A1* | 1/2019 | Hong ...................... | H04N 23/73 |
| 2019/0075263 | A1* | 3/2019 | Mlinar ..................... | H04N 1/64 |
| 2023/0078758 | A1* | 3/2023 | Yanagisawa ......... | H04N 23/745 |
| | | | | 348/226.1 |
| 2023/0342909 | A1* | 10/2023 | Hyatt ..................... | G06V 10/25 |

FOREIGN PATENT DOCUMENTS

JP H05-176233 A 7/1993

* cited by examiner

*Primary Examiner* — Anthony J Daniels
(74) *Attorney, Agent, or Firm* — K&L Gates LLP

(57) ABSTRACT

A detection device includes a light source, and an optical sensor comprising a plurality of photodiodes configured to output pixel data corresponding to a light intensity irradiating the photodiodes. The optical sensor is configured to capture a first image containing a plurality of pieces of first pixel data and a second image that contains a plurality of pieces of second pixel data and is more sensitive than the first image, the second pixel data having a gradation equal to or smaller than a predetermined threshold is selected in the second image, the first pixel data in an area corresponding to a deselected second pixel data is selected in the first image, and a composite image is generated based on the selected second pixel data and the selected first pixel data.

7 Claims, 13 Drawing Sheets

FIG.1
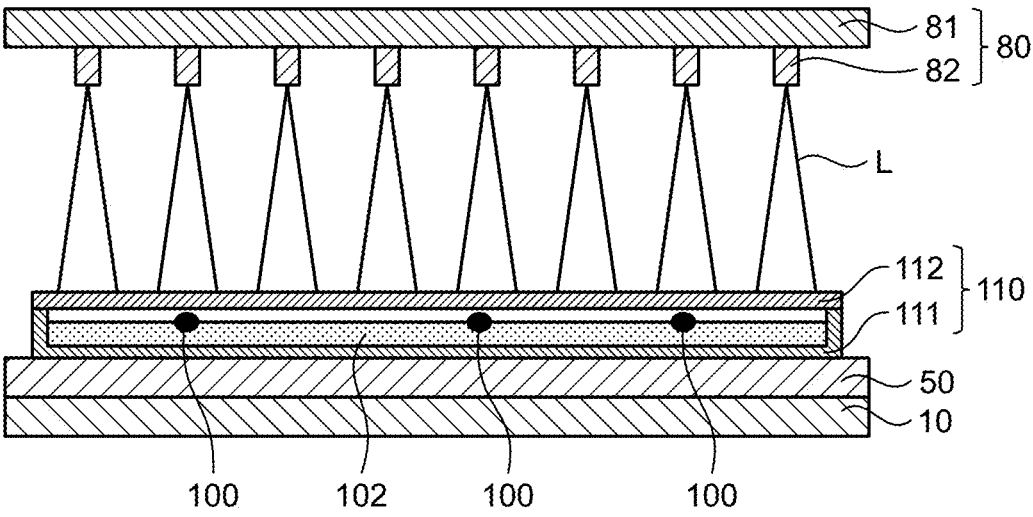

Figure 10:
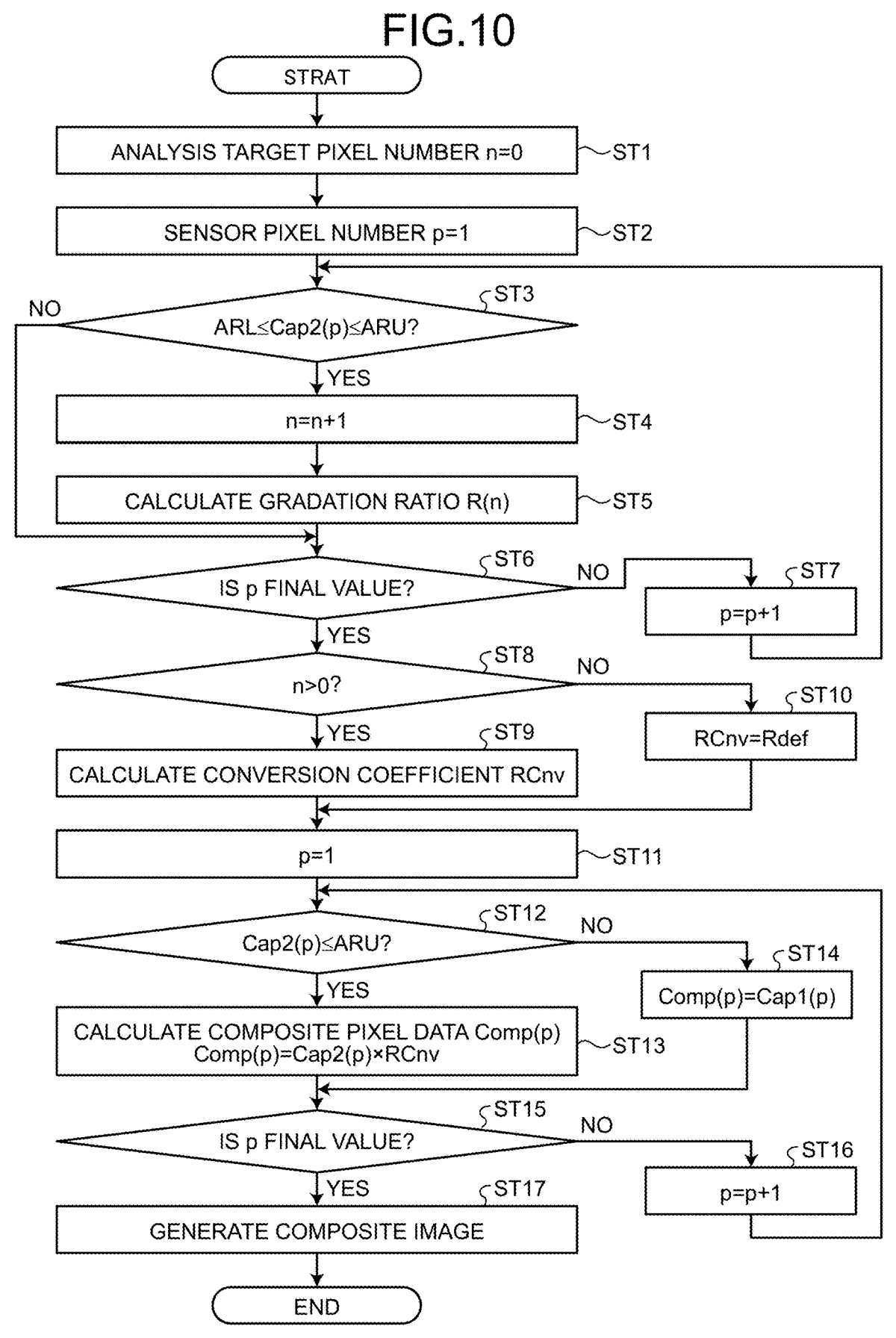

STRAT

ANALYSIS TARGET PIXEL NUMBER n=0 —— ST1

SENSOR PIXEL NUMBER p=1 —— ST2

ST3 ── ARL≤Cap2(p)≤ARU? ── NO

YES n=n+1 —— ST4

CALCULATE GRADATION RATIO R(n) —— ST5

ST6 ── IS p FINAL VALUE? ── NO ── p=p+1 —— ST7

YES

ST8 ── n>0? ── NO ── RCnv=Rdef —— ST10

YES ── ST9

CALCULATE CONVERSION COEFFICIENT RCnv p=1 —— ST11

ST12 ── Cap2(p)≤ARU? ── NO ── Comp(p)=Cap1(p) —— ST14

YES

CALCULATE COMPOSITE PIXEL DATA Comp(p)
Comp(p)=Cap2(p)×RCnv —— ST13

ST15 ── IS p FINAL VALUE? ── NO ── p=p+1 —— ST16

YES ── ST17

GENERATE COMPOSITE IMAGE

END

FIG.14

DETECTION DEVICE

CROSS-REFERENCE TO RELATED APPLICATION

This application claims the benefit of priority from Japanese Patent Application No. 2023-104117 filed on Jun. 26, 2023, the entire contents of which are incorporated herein by reference.

BACKGROUND

1. Technical Field

The present invention relates to a detection device.

2. Description of the Related Art

Japanese Patent Application Laid-open Publication No. H05-176233 (JP-A-H05-176233) describes an image input device using a solid-state image pickup device such as a charge-coupled device (CCD). In JP-A-H05-176233, the image pickup device reads the same image a plurality of times while changing the accumulation time. Then, one of two pieces of image information is selected for each pixel by comparing the two pieces of image information with a reference value Dref, and the selected pieces of image information are combined. The reference value Dref is uniquely set correspondingly to an output signal of the image pickup device.

In actual image pickup, types (colors) of an object to be detected and a culture medium vary, and variations are present in in-plane luminance distribution of irradiation from each light source to a sensor or photosensitivity of the sensor. Therefore, if the uniquely set reference value is not appropriate, a good composite image may not be obtained by combining two pieces of image information.

SUMMARY

A detection device according to an embodiment of the present disclosure includes a light source, and an optical sensor comprising a plurality of photodiodes configured to output pixel data corresponding to a light intensity irradiating the photodiodes. The optical sensor is configured to capture a first image containing a plurality of pieces of first pixel data and a second image that contains a plurality of pieces of second pixel data and is more sensitive than the first image, the second pixel data having a gradation equal to or smaller than a predetermined threshold is selected in the second image, the first pixel data in an area corresponding to a deselected second pixel data is selected in the first image, and a composite image is generated based on the selected second pixel data and the selected first pixel data.

BRIEF DESCRIPTION OF THE DRAWINGS

FIG. 1 is a sectional view schematically illustrating a detection device according to a first embodiment of the present invention;

FIG. 8 is a timing waveform diagram for explaining an operation example of the detection device according to the first embodiment;

FIG. 10 is a flowchart illustrating the method for generating the composite image by the detection device according to the first embodiment;

FIG. 14 is an explanatory diagram for explaining a method for correcting luminance of the composite image by the detection device according to a third embodiment of the present invention.

DETAILED DESCRIPTION

Figure 2:
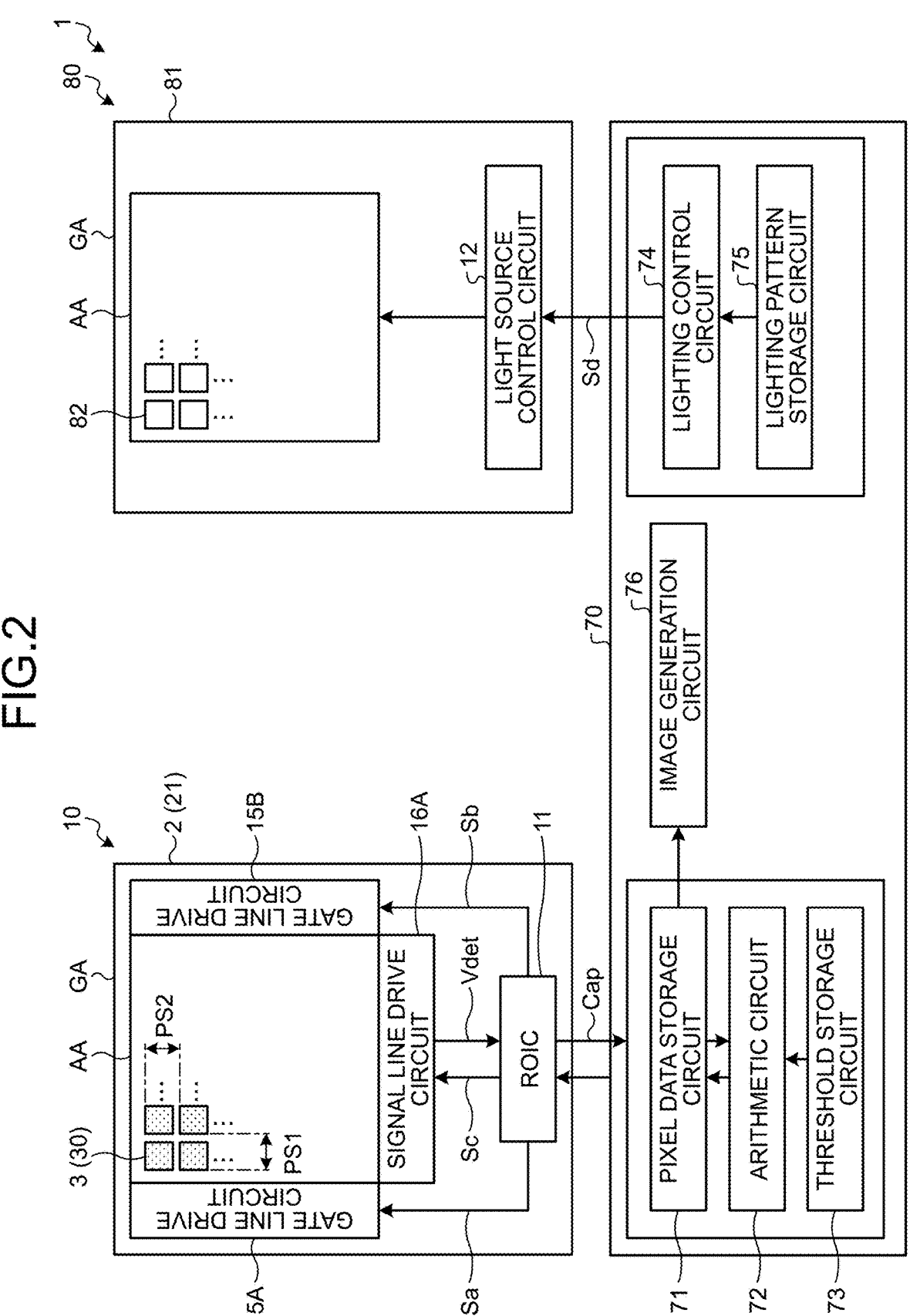
FIG. 2 is a block diagram illustrating a configuration example of the detection device according to the first embodiment.

The following describes modes (embodiments) for carrying out the present invention in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure above a certain structure, a case of simply expressing "above" includes both a case of disposing the other structure immediately above the certain structure so as to contact the certain structure and a case of disposing the other structure above the certain structure with still another structure interposed therebetween, unless otherwise specified.

First Embodiment

FIG. 1 is a sectional view schematically illustrating a detection device according to a first embodiment of the present invention. As illustrated in FIG. 1, a detection device 1 includes an optical sensor 10, an optical filter layer 50, a mounting substrate 110 for mounting objects to be detected 100, and a light source device 80. The optical filter layer 50, the mounting substrate 110 (an object to be detected 100 and a culture medium 102), and the light source device 80 are arranged in this order above the optical sensor 10.

The object to be detected 100 is a micro-object such as a bacterium. The detection device 1 is a biosensor that detects the micro-object such as the bacterium. The mounting substrate 110 is a light-transmitting container formed of glass, for example. The mounting substrate 110 includes a container body 111 and a cover member 112. The mounting substrate 110 is a Petri dish, for example. A plurality of the objects to be detected 100 are mounted together with the culture medium 102 in the container body 111 of the mounting substrate 110. The cover member 112 covering the objects to be detected 100 is provided on the upper side of the container body 111. The objects to be detected 100 serving as detection targets are mounted in the mounting substrate 110, and located between the optical sensor 10 and the light source device 80.

The objects to be detected 100 are not limited to the bacteria, and may be other micro-objects such as cells. The detection device 1 may be configured as, for example, a fingerprint detection device that detects a fingerprint or a vein detection device that detects a vascular pattern of, for example, veins. In this case, the object to be detected 100 may be a living body such as a finger, a palm, or a wrist.

The optical sensor 10 is a planar detection device that includes a plurality of photodiodes 30 (photodetection elements) arranged in a planar configuration. A detailed configuration of the optical sensor 10 will be described later with reference to FIG. 2 and FIGS. 5 and 6.

The optical filter layer 50 is a light directivity control element disposed between a plurality of light sources 82 (light source device 80) and the photodiodes 30 (optical sensor 10). More specifically, the optical filter layer 50 is provided between the photodiodes 30 of the optical sensor 10 and the mounting substrate 110. The optical filter layer 50 is disposed so as to face the photodiodes 30 of the optical sensor 10. The optical filter layer 50 is an optical element that transmits components of light L emitted from the light sources 82 that travel in a direction orthogonal to the optical sensor 10 toward the photodiodes 30. The optical filter layer 50 is also called collimating apertures or a collimator.

The light source device 80 includes a light source substrate 81 and the light sources 82. The light sources 82 are point light sources provided correspondingly to the photodiodes 30 of the optical sensor 10. The light sources 82 are provided on the light source substrate 81 and arranged so as to face the photodiodes 30 of the optical sensor 10. Each of the light sources 82 is configured as a light-emitting diode (LED), for example.

The light L emitted from the light sources 82 passes through the mounting substrate 110 (container body 111 and cover member 112), the culture medium 102, and the optical filter layer 50, and is emitted toward the photodiodes 30 of the optical sensor 10. The intensity of light irradiating the photodiodes 30 differs between an area overlapping the object to be detected 100 and an area not overlapping the object to be detected 100. As a result, the optical sensor 10 can image the objects to be detected 100.

In the present embodiment, the light sources 82 are arranged at a predetermined pitch as the point light sources. As a result, compared with a case where a surface light source is provided, the direction of the light L is restrained from varying, thus enabling better imaging. The arrangement pitch of the light sources 82 is set so as to reduce interference of the light L emitted from the adjacent light sources 82. In addition, the viewing angle of the light L irradiating the optical sensor 10 is limited by the optical filter layer 50, and arrangement pitches PS1 and PS2 of the photodiodes 30 are set so as to ensure the light-receiving area of the optical sensor 10.

FIG. 2 is a block diagram illustrating a configuration example of the detection device according to the first embodiment. As illustrated in FIG. 2, the detection device 1 further includes a host integrated circuit (IC) 70 that controls the optical sensor 10 and the light source device 80. The optical sensor 10 includes an array substrate 2, a plurality of sensor pixels 3 (photodiodes 30) formed on the array substrate 2, gate line drive circuits 15A and 15B, a signal line drive circuit 16A, and a detection control circuit 11.

The array substrate 2 is formed using a substrate 21 as a base. Each of the sensor pixels 3 is configured with a corresponding one of the photodiodes 30, a plurality of transistors, and various types of wiring. The array substrate 2 on which the photodiodes 30 are formed is a drive circuit board for driving the sensor for each predetermined detection area, and is also called a backplane or an active matrix substrate.

The substrate 21 has a detection area AA and a peripheral area GA. The detection area AA is an area provided with the sensor pixels 3 (photodiodes 30). The peripheral area GA is an area between the outer perimeter of the detection area AA and the outer edges of the substrate 21, and is an area not provided with the sensor pixels 3. The gate line drive circuits 15A and 15B, the signal line drive circuit 16A, and the detection control circuit 11 are provided in the peripheral area GA.

Each of the sensor pixels 3 is an optical sensor including the photodiode 30 as a sensor element. Each of the photodiodes 30 outputs an electrical signal corresponding to light emitted thereto. More specifically, the photodiode 30 is a positive-intrinsic-negative (PIN) photodiode or an organic photodiode (OPD) using an organic semiconductor. The sensor pixels 3 (photodiodes 30) are arranged in a matrix having a row-column configuration in the detection area AA.

The detection control circuit 11 is a circuit that supplies control signals Sa, Sb, and Sc to the gate line drive circuits 15A and 15B, and the signal line drive circuit 16A, respectively, to control operations of these circuits. Specifically, the gate line drive circuits 15A and 15B output gate drive signals to a gate line GLS (refer to FIG. 4) based on the control signals Sa and Sb. The signal line drive circuit 16A electrically couples a signal line SLS selected based on the control signal Sc to the detection control circuit 11. The detection control circuit 11 includes a signal processing circuit that performs signal processing of a detection signal Vdet from each of the photodiodes 30.

The photodiodes 30 included in the sensor pixels 3 perform detection in response to the gate drive signals supplied from the gate line drive circuits 15A and 15B. Each of the photodiodes 30 outputs the electrical signal corresponding to the light emitted thereto as the detection signal Vdet to the signal line drive circuit 16A. The detection control circuit 11 (detection circuit) is electrically coupled to the photodiodes 30. The detection control circuit 11 performs the signal processing of each of the detection signals Vdet from the photodiodes 30, and outputs pixel data Cap based on the detection signal Vdet to the host IC 70. The pixel data Cap is a sensor value acquired for each of the sensor pixels 3. Thus, the detection device 1 detects information on the object to be detected 100.

Figure 3:
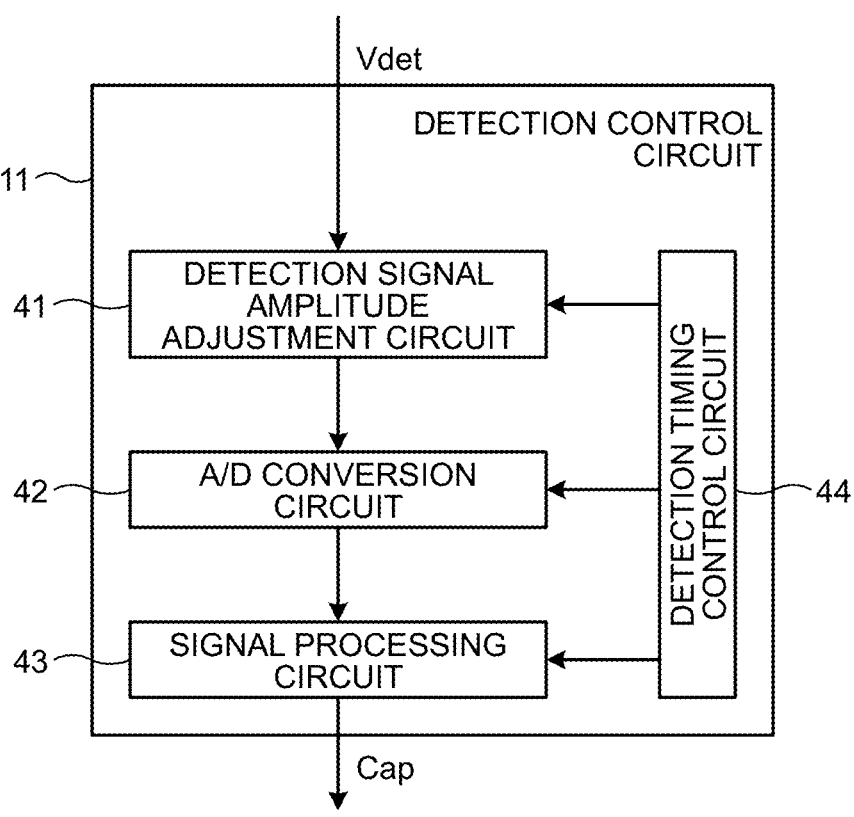
FIG. 3 is a block diagram illustrating a configuration example of a detection control circuit according to the first embodiment.

FIG. 3 is a block diagram illustrating a configuration example of the detection control circuit according to the first embodiment. As illustrated in FIG. 3, the detection control circuit 11 includes a detection signal amplitude adjustment circuit 41, an analog-to-digital (A/D) conversion circuit 42, a signal processing circuit 43, and a detection timing control circuit 44. In the detection control circuit 11, the detection timing control circuit 44 performs control to cause the detection signal amplitude adjustment circuit 41, the A/D conversion circuit 42, and the signal processing circuit 43 to operate in synchronization with one another based on a control signal supplied from the host IC 70 (refer to FIG. 2).

The detection signal amplitude adjustment circuit 41 is a circuit that adjusts the amplitude of the detection signal Vdet output from the photodiode 30, and is configured with an amplifier, for example. The A/D conversion circuit 42 converts analog signals output from the detection signal amplitude adjustment circuit 41 into digital signals. The signal processing circuit 43 is a circuit that performs signal processing of the digital signals from the A/D conversion circuit 42 and transmits the pixel data Cap to the host IC 70.

Referring back to FIG. 2, the light source device 80 includes the light source substrate 81, and the light sources 82 and a light source control circuit 12 that are formed on the light source substrate 81. The light sources 82 are arranged in a matrix having a row-column configuration in an area of the light source substrate 81 overlapping the detection area AA. On the light source substrate 81, switching between on (lit state) and off (unlit state) is performed based on a control signal from the light source control circuit 12.

Figure 8:
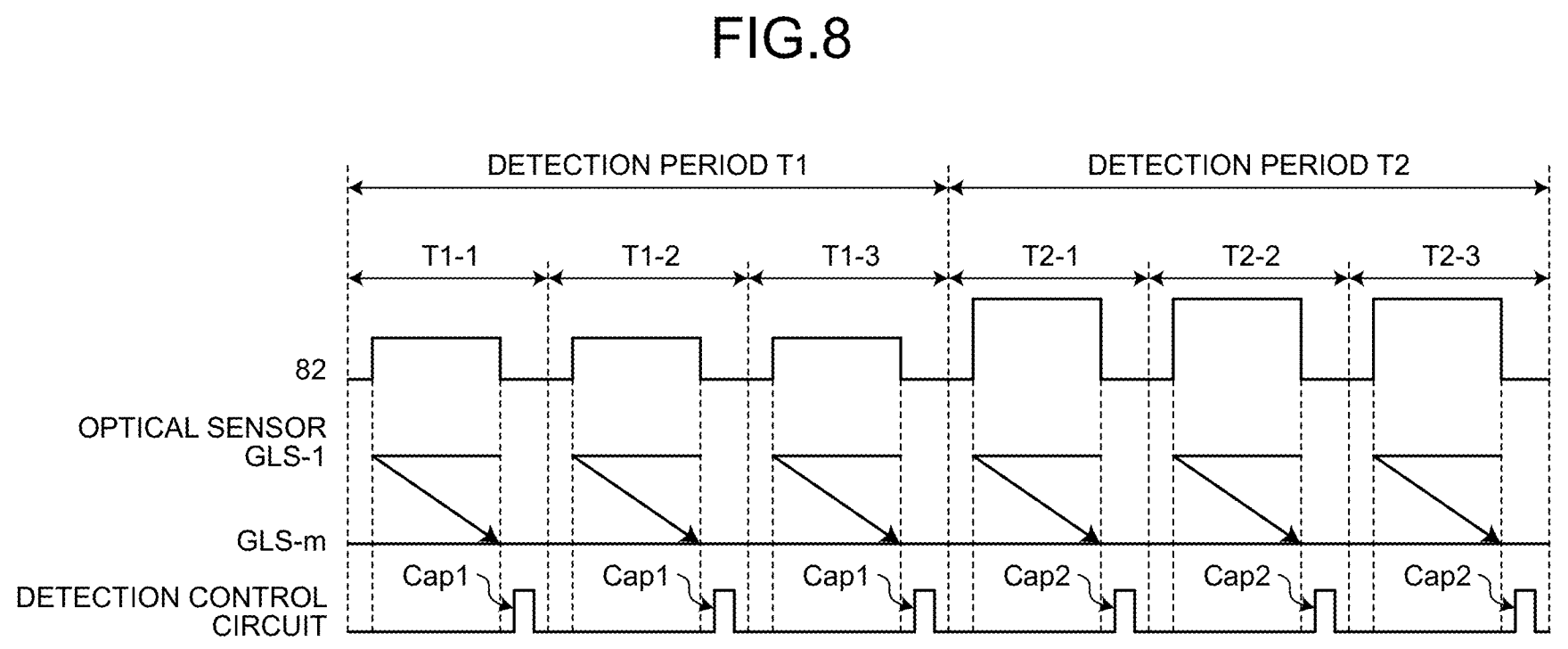

The light source control circuit 12 turns on the light sources 82 at different light intensities for each of detection periods T1 and T2 (refer to FIG. 8). The light source device 80 may switch the light sources 82 between the lit state (on) and the unlit state (off) for each unit of a plurality of the light sources 82.

Any method may be used to control on and off of the light sources 82. For example, the light source control circuit 12 may individually control each of the light sources 82. The light source substrate 81 of the light source device 80 may be what is called an active matrix substrate.

The host IC 70 controls the optical sensor 10 and the light source device 80 to capture a low-sensitivity first image IM1 that includes a plurality of pieces of first pixel data Cap1 and a second image IM2 that contains a plurality of pieces of second pixel data Cap2 and is more sensitive than the first image IM1. The host IC 70 then generates a composite image IM-C based on the second pixel data Cap2 selected in the second image IM2 and the first pixel data Cap1 selected in the first image IM1. The detection device 1 of the present embodiment can be said to be an image generation device that generates the composite image IM-C. A method for generating the composite image IM-C will be described later in detail with reference to FIG. 7 and the subsequent drawings.

The host IC 70 includes a pixel data storage circuit 71, an arithmetic circuit 72, and a threshold storage circuit 73 as control circuits on the optical sensor 10 side. The pixel data storage circuit 71 stores therein the pixel data Cap (first pixel data Cap1 and second pixel data Cap2) output from the detection control circuit 11 of the optical sensor 10. The arithmetic circuit 72 performs a predetermined arithmetic process on the pixel data Cap of the photodiodes 30. For example, the arithmetic circuit 72 selects the first and the second pixel data Cap1 and Cap2 in the first and the second images IM1 and IM2, respectively, by comparing the pixel data with predetermined thresholds.

The threshold storage circuit 73 is a circuit that stores a first threshold ARU and a second threshold ARL (refer to FIG. 10) for selecting the second pixel data Cap2 in the second image IM2. The pixel data storage circuit 71 and the threshold storage circuit 73 are described as different circuits, but may be formed as one storage circuit. The pixel data storage circuit 71 and the threshold storage circuit 73 are not limited to storing the pixel data Cap and the thresholds, but may also store other various types of information.

The host IC 70 includes a lighting control circuit 74 and a lighting pattern storage circuit 75 as control circuits on the light source device 80 side. The lighting pattern storage circuit 75 stores therein the light intensity of the light sources 82 or, as necessary, arrangement patterns of the light sources 82 that are on (lit) and those that are off (unlit). The lighting control circuit 74 outputs a control signal Sd to the light source control circuit 12 based on various types of information from the lighting pattern storage circuit 75 (for example, information on the light intensity of the light sources 82).

The host IC 70 further includes an image generation circuit 76. The image generation circuit 76 combines the first and the second pixel data Cap1 and Cap2 selected in the arithmetic circuit 72 with each other to generate the composite image IM-C.

While not illustrated in the drawings, the host IC 70 includes a control circuit that synchronously controls the detection control circuit 11 and the light source control circuit 12. That is, the switching of the light intensity of the light sources 82 on the light source device 80 side and the detection of the photodiodes 30 on the optical sensor 10 side are synchronously controlled based on a control signal from the host IC 70.

The optical sensor 10 includes the two gate line drive circuits 15A and 15B, but may include one gate line drive circuit. The light source 80 includes the light source control circuit 12, which may be provided as a common circuit with the lighting control circuit 74 of the host IC 70.

Figure 4:
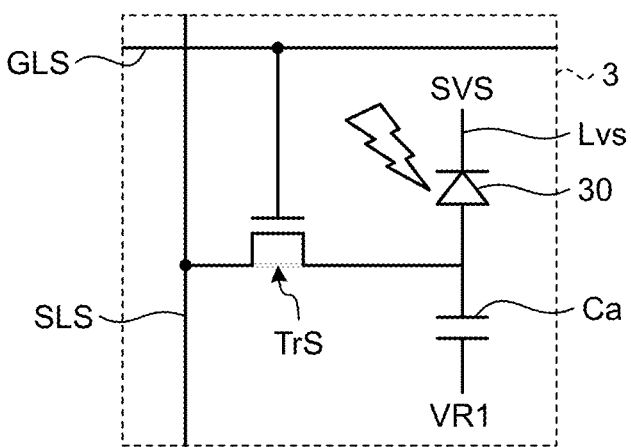
FIG. 4 is a circuit diagram illustrating a sensor pixel.

The following describes a configuration example of the optical sensor 10. FIG. 4 is a circuit diagram illustrating the sensor pixel. As illustrated in FIG. 4, the sensor pixel 3 includes the photodiode 30, a capacitive element Ca, and a transistor TrS. The transistor TrS is provided correspondingly to the photodiode 30. The transistor TrS is formed of a thin-film transistor, and in this example, formed of an n-channel metal oxide semiconductor (MOS) thin-film transistor (TFT). The gate of the transistor TrS is coupled to the gate line GLS. The source of the transistor TrS is coupled to the signal line SLS. The drain of the transistor TrS is coupled to the anode of the photodiode 30 and the capacitive element Ca.

The cathode of the photodiode 30 is supplied with a power supply potential SVS from the detection control circuit 11. The capacitive element Ca is supplied with a reference potential VR1 serving as an initial potential of the capacitive element Ca from the detection control circuit 11.

When the sensor pixel 3 is irradiated with light, a current corresponding to the amount of the light flows through the photodiode 30. As a result, an electric charge is stored in the capacitive element Ca. Turning on the transistor TrS causes a current corresponding to the electric charge stored in the capacitive element Ca to flow through the signal line SLS. The signal line SLS is coupled to the detection control circuit 11 through the signal line drive circuit 16A. The optical sensor 10 of the detection device 1 can thereby detect a signal corresponding to the amount of the light irradiating the photodiode 30 for each of the sensor pixels 3.

The transistor TrS is not limited to an n-type TFT, and may be configured as a p-type TFT. The pixel circuit of the sensor pixel 3 illustrated in FIG. 4 is merely exemplary. The sensor pixel 3 may be provided with a plurality of transistors corresponding to one photodiode 30.

Figure 5:
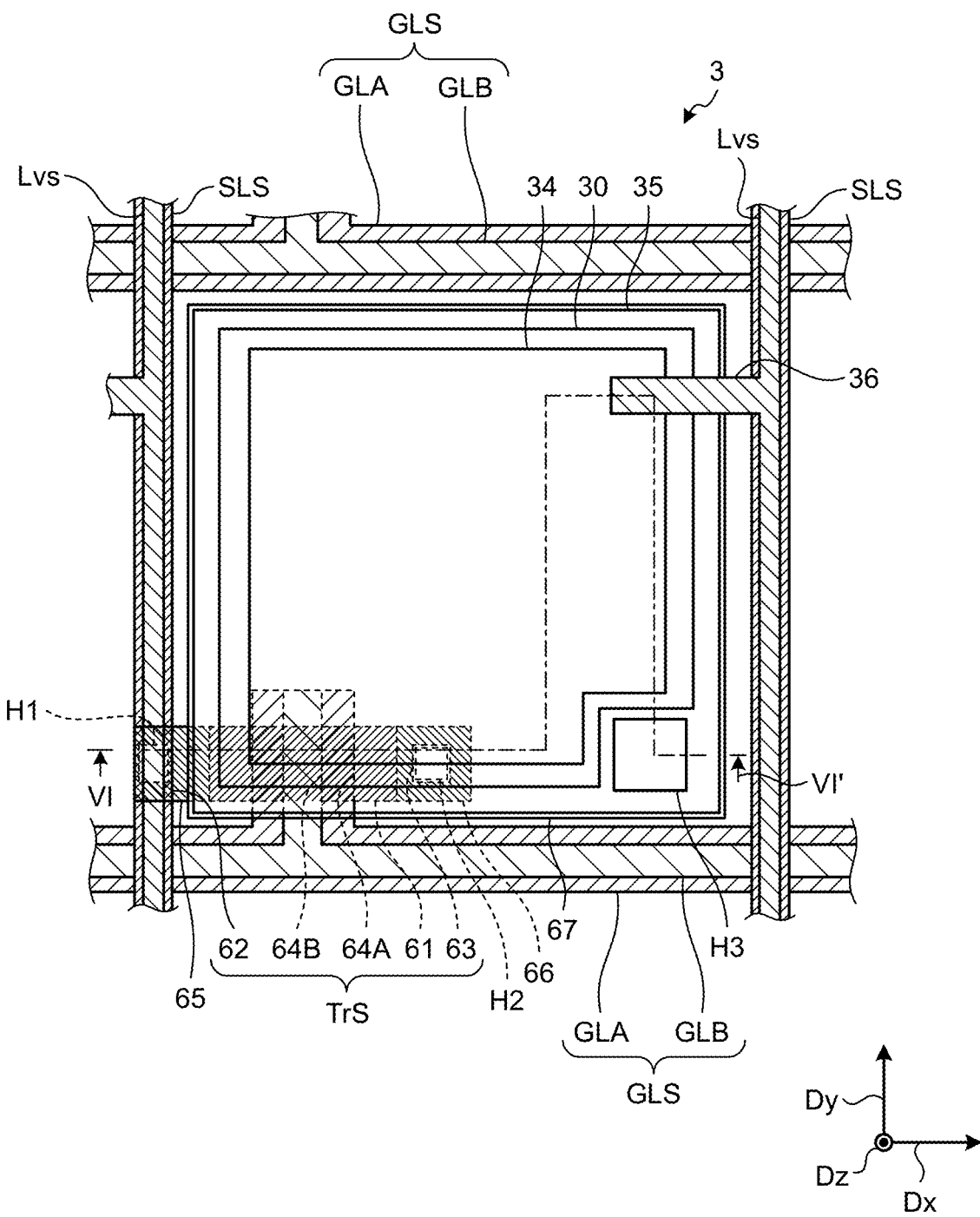
FIG. 5 is a plan view schematically illustrating the sensor pixel according to the first embodiment.

The following describes a detailed configuration of the optical sensor 10. FIG. 5 is a plan view schematically illustrating the sensor pixel according to the first embodiment.

In the following description, a first direction Dx is one direction in a plane parallel to the substrate 21 (refer to FIG. 6). A second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to a principal surface of the substrate 21. The term "plan view" refers to a positional relation when viewed from a direction orthogonal to the substrate 21.

As illustrated in FIG. 5, the sensor pixel 3 is an area surrounded by the gate lines GLS and the signal lines SLS. In the present embodiment, the gate line GLS includes a first gate line GLA and a second gate line GLB. The first gate line GLA is provided so as to overlap the second gate line GLB. The first and the second gate lines GLA and GLB are provided in different layers with insulating layers 22c and 22d (refer to FIG. 6) interposed therebetween. The first and the second gate lines GLA and GLB are electrically coupled together at any point, and are supplied with the gate drive signals having the same potential. At least one of the first and the second gate lines GLA and GLB is coupled to the gate line drive circuits 15A and 15B. In FIG. 5, the first and the second gate lines GLA and GLB have different widths, but may have the same width.

The photodiode 30 is provided in the area surrounded by the gate lines GLS and the signal lines SLS. An upper electrode 34 and a lower electrode 35 are provided correspondingly to each of the photodiodes 30. The photodiode 30 is a PIN photodiode, for example. The lower electrode 35 is, for example, an anode electrode of the photodiode 30. The upper electrode 34 is, for example, a cathode electrode of the photodiode 30.

The upper electrode 34 is coupled to a power supply signal line Lvs through coupling wiring 36. The power supply signal line Lvs is wiring that supplies the power supply potential SVS to the photodiode 30. In the present embodiment, the power supply signal line Lvs extends in the second direction Dy while overlapping the signal line SLS. The sensor pixels 3 arranged in the second direction Dy are coupled to the common power supply signal line Lvs. Such a configuration can enlarge an opening for the sensor pixel 3. The lower electrode 35, the photodiode 30, and the upper electrode 34 are substantially quadrilateral in plan view. However, the shapes of the lower electrode 35, the photodiode 30, and the upper electrode 34 are not limited thereto, and can be changed as appropriate.

The transistor TrS is provided near an intersection between the gate line GLS and the signal line SLS. The transistor TrS includes a semiconductor layer 61, a source electrode 62, a drain electrode 63, a first gate electrode 64A, and a second gate electrode 64B.

The semiconductor layer 61 is an oxide semiconductor. The semiconductor layer 61 is more preferably a transparent amorphous oxide semiconductor (TAOS) among types of the oxide semiconductor. Using an oxide semiconductor as the transistor TrS can reduce a leakage current of the transistor TrS. That is, the transistor TrS can reduce the leakage current from the sensor pixel 3 that is not selected. Therefore, the optical sensor 10 can improve the signal-to-noise ratio (S/N). The semiconductor layer 61 is, however, not limited thereto, and may be formed of, for example, a microcrystalline oxide semiconductor, an amorphous oxide semiconductor, polysilicon, or low-temperature polycrystalline silicon (LTPS).

The semiconductor layer 61 is provided along the first direction Dx, and intersects the first and the second gate electrodes 64A and 64B in plan view. The first and the second gate electrodes 64A and 64B are provided so as to branch from the first and the second gate lines GLA and GLB, respectively. In other words, portions of the first and the second gate lines GLA and GLB that overlap the semiconductor layer 61 serve as the first and the second gate electrodes 64A and 64B. Aluminum (Al), copper (Cu), silver (Ag), molybdenum (Mo), or an alloy of these metals is used as the first and the second gate electrodes 64A and 64B. A channel region is formed at a portion of the semiconductor layer 61 that overlaps the first and the second gate electrodes 64A and 64B.

One end of the semiconductor layer 61 is coupled to the source electrode 62 through a contact hole H1. The other end of the semiconductor layer 61 is coupled to the drain electrode 63 through a contact hole H2. A portion of the signal line SLS that overlaps the semiconductor layer 61 serves as the source electrode 62. A portion of a third conductive layer 67 that overlaps the semiconductor layer 61 serves as the drain electrode 63. The third conductive layer 67 is coupled to the lower electrode 35 through a contact hole H3. Such a configuration allows the transistor TrS to switch between coupling and decoupling between the photodiode 30 and the signal line SLS.

The following describes a layer configuration of the optical sensor 10. FIG. 6 is a sectional view along VI-VI' of FIG. 5.

In the description of the detection device 1 that includes the optical sensor 10, a direction from the substrate 21 toward the photodiode 30 in a direction (third direction Dz) orthogonal to a surface of the substrate 21 is referred to as "upper side" or "above". A direction from the photodiode 30 toward the substrate 21 is referred to as "lower side" or "below".

Figure 6:
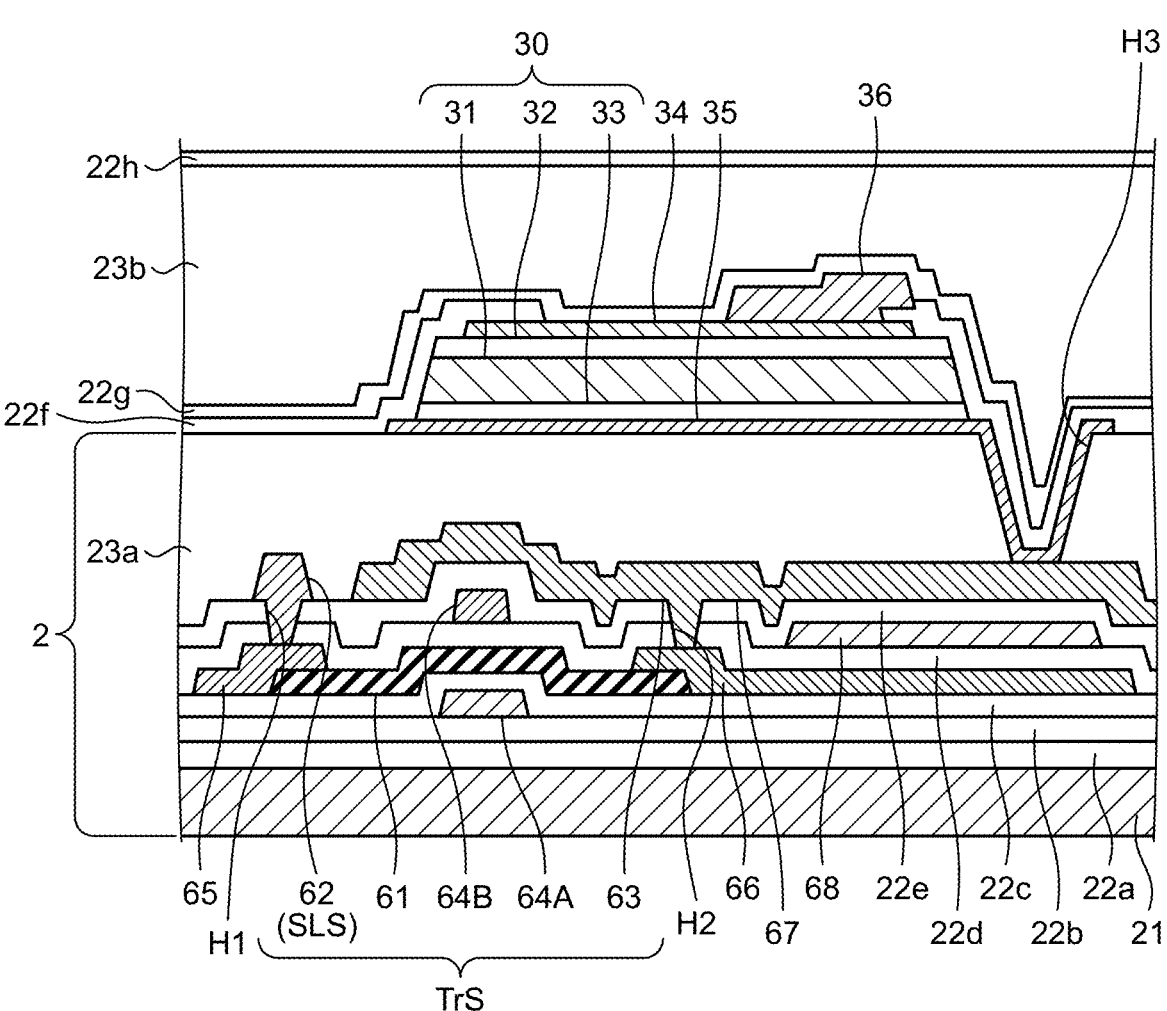
FIG. 6 is a sectional view along VI-VI' of FIG. 5.

As illustrated in FIG. 6, the substrate 21 is an insulating substrate, and is made using, for example, a glass substrate of quartz, alkali-free glass, or the like. The transistors TrS, various types of wiring (gate lines GLS and signal lines SLS), and insulating layers are provided on one surface side of the substrate 21 to form the array substrate 2. The photodiodes 30 are arranged on the array substrate 2, that is, on the one surface side of the substrate 21. The substrate 21 may be a resin substrate or a resin film made of a resin such as polyimide.

Insulating layers 22a and 22b are provided on the substrate 21. Insulating layers 22a, 22b, 22c, 22d, 22e, 22f, and 22g are inorganic insulating films of, for example, silicon oxide (SiO$_2$) or silicon nitride (SiN). Each of the inorganic insulating layers is not limited to a single layer, but may be a multilayered film.

The first gate electrode 64A is provided on the insulating layer 22b. The insulating layer 22c is provided on the insulating layer 22b so as to cover the first gate electrode 64A. The semiconductor layer 61, a first conductive layer 65, and a second conductive layer 66 are provided on the insulating layer 22c. The first conductive layer 65 is provided so as to cover an end of the semiconductor layer 61 coupled to the source electrode 62. The second conductive layer 66 is provided so as to cover an end of the semiconductor layer 61 coupled to the drain electrode 63.

The insulating layer 22d is provided on the insulating layer 22c so as to cover the semiconductor layer 61, the first conductive layer 65, and the second conductive layer 66. The second gate electrode 64B is provided on the insulating layer 22d. The semiconductor layer 61 is provided between the first gate electrode 64A and the second gate electrode 64B in the direction orthogonal to the substrate 21. That is, the transistor TrS has what is called a dual-gate structure. The transistor TrS may, however, have a bottom-gate structure that is provided with the first gate electrode 64A and not provided with the second gate electrode 64B, or a top-gate structure that is not provided with the first gate electrode 64A and provided with only the second gate electrode 64B.

The insulating layer 22e is provided on the insulating layer 22d so as to cover the second gate electrode 64B. The source electrode 62 (signal line SLS) and the drain electrode 63 (third conductive layer 67) are provided on the insulating layer 22e. In the present embodiment, the drain electrode 63 is the third conductive layer 67 provided above the semiconductor layer 61 with the insulating layers 22d and 22e interposed therebetween. The source electrode 62 is electrically coupled to the semiconductor layer 61 through the contact hole H1 and the first conductive layer 65. The drain electrode 63 is electrically coupled to the semiconductor layer 61 through the contact hole H2 and the second conductive layer 66.

The third conductive layer 67 is provided in an area overlapping the photodiode 30 in plan view. The third conductive layer 67 is provided also on the upper side of the semiconductor layer 61 and the first and the second gate electrodes 64A and 64B. That is, the third conductive layer 67 is provided between the second gate electrode 64B and the lower electrode 35 in the direction orthogonal to the substrate 21. This configuration causes the third conductive layer 67 to have a function as a protective layer that protects the transistor TrS.

The second conductive layer 66 extends so as to face the third conductive layer 67 in an area not overlapping the semiconductor layer 61. A fourth conductive layer 68 is provided on the insulating layer 22d in an area not overlapping the semiconductor layer 61. The fourth conductive layer 68 is provided between the second conductive layer 66 and the third conductive layer 67. This configuration generates capacitance between the second conductive layer 66 and the fourth conductive layer 68, and capacitance between the third conductive layer 67 and the fourth conductive layer 68. The capacitance generated by the second conductive layer 66, the third conductive layer 67, and the fourth conductive layer 68 serves as capacitance of the capacitive element Ca illustrated in FIG. 4.

A first organic insulating layer 23a is provided on the insulating layer 22e so as to cover the source electrode 62 (signal line SLS) and the drain electrode 63 (third conductive layer 67). The first organic insulating layer 23a is a planarizing layer that planarizes asperities formed by the transistor TrS and various conductive layers.

The following describes a sectional configuration of the photodiode 30. The lower electrode 35, the photodiode 30, and the upper electrode 34 are stacked in this order on the first organic insulating layer 23a of the array substrate 2.

The lower electrode 35 is provided on the first organic insulating layer 23a, and is electrically coupled to the third conductive layer 67 through the contact hole H3. The lower electrode 35 is the anode of the photodiode 30, and is an electrode for reading the detection signal Vdet. For example, a metal material such as molybdenum (Mo) or aluminum (Al) is used as the lower electrode 35. The lower electrode 35 may alternatively be a multilayered film formed of a plurality of layers of these metal materials. The lower electrode 35 may be formed of a light-transmitting conductive material such as indium tin oxide (ITO) or indium zinc oxide (IZO).

The photodiode 30 includes an i-type semiconductor layer 31, an n-type semiconductor layer 32, and a p-type semiconductor layer 33 as semiconductor layers. The i-type semiconductor layer 31, the n-type semiconductor layer 32, and the p-type semiconductor layer 33 are formed of amorphous silicon (a-Si), for example. In FIG. 6, the p-type semiconductor layer 33, the i-type semiconductor layer 31, and the n-type semiconductor layer 32 are stacked in this order in the direction orthogonal to the surface of the substrate 21. However, a reversed configuration may be used. That is, the n-type semiconductor layer 32, the i-type semiconductor layer 31, and the p-type semiconductor layer 33 may be stacked in this order. Each of the semiconductor layers may be a photoelectric conversion element formed of an organic semiconductor.

The a-Si of the n-type semiconductor layer 32 is doped with impurities to form an n+ region. The a-Si of the p-type semiconductor layer 33 is doped with impurities to form a p+ region. The i-type semiconductor layer 31 is, for example, a non-doped intrinsic semiconductor, and has lower conductivity than that of the n-type semiconductor layer 32 and the p-type semiconductor layer 33.

The upper electrode 34 is the cathode of the photodiode 30, and is an electrode for supplying the power supply potential SVS to the photoelectric conversion layers. The upper electrode 34 is, for example, a light-transmitting conductive layer of, for example, ITO, and a plurality of the upper electrodes 34 are provided for the respective photodiodes 30.

The insulating layers 22f and 22g are provided on the first organic insulating layer 23a. The insulating layer 22f covers the periphery of the upper electrode 34, and is provided with an opening in a position overlapping the upper electrode 34. The coupling wiring 36 is coupled to the upper electrode 34 at a portion of the upper electrode 34 not provided with the insulating layer 22f. The insulating layer 22g is provided on the insulating layer 22f so as to cover the upper electrode 34 and the coupling wiring 36. A second organic insulating layer 23b serving as a planarizing layer is provided on the insulating layer 22g. If the photodiode 30 is made of organic semiconductors, an insulating layer 22h may be further provided above the photodiode 30.

Figure 7:
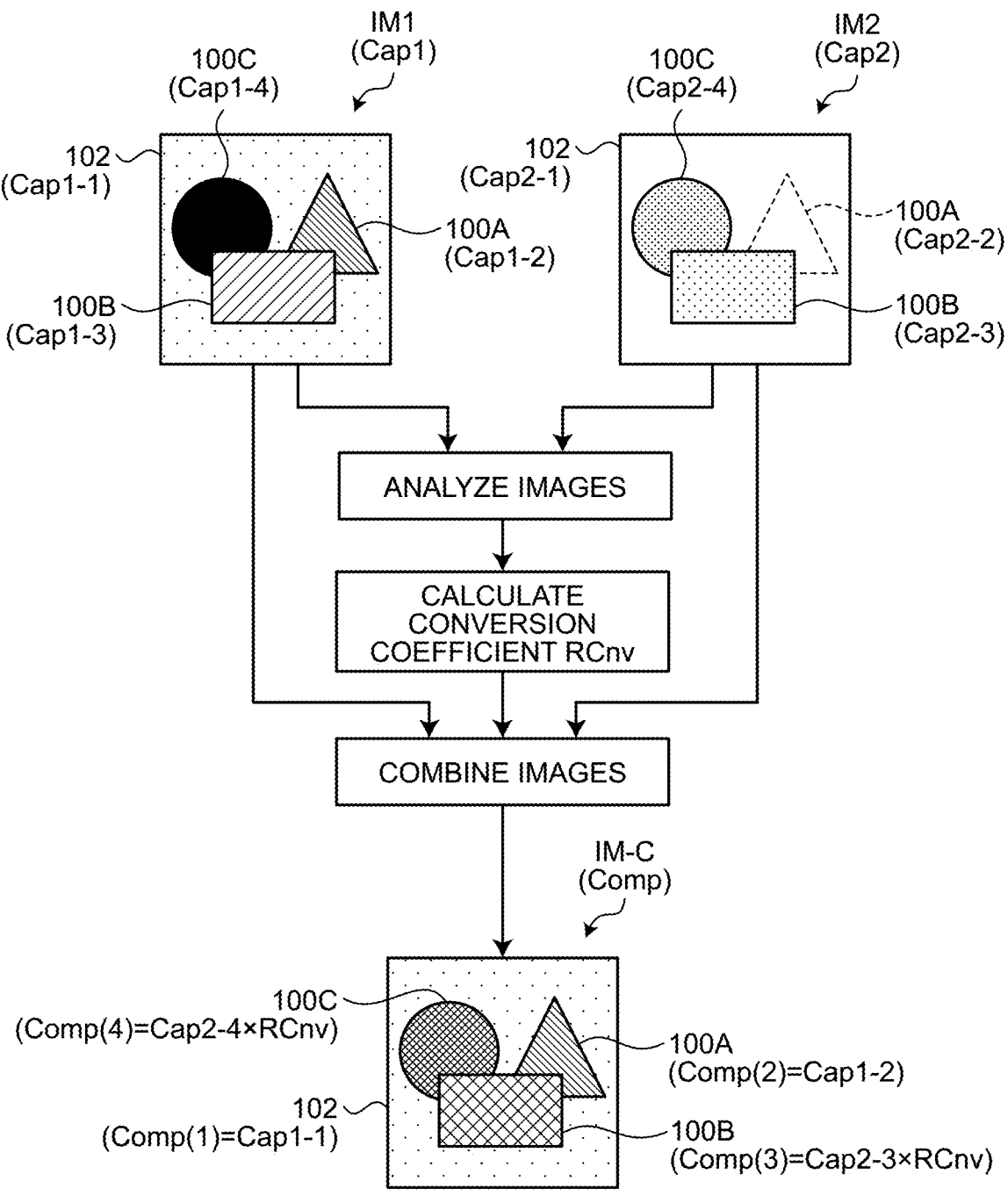
FIG. 7 is an explanatory diagram for schematically explaining a method for generating a composite image using a low-sensitivity first image and a high-sensitivity second image.
Figure 9:
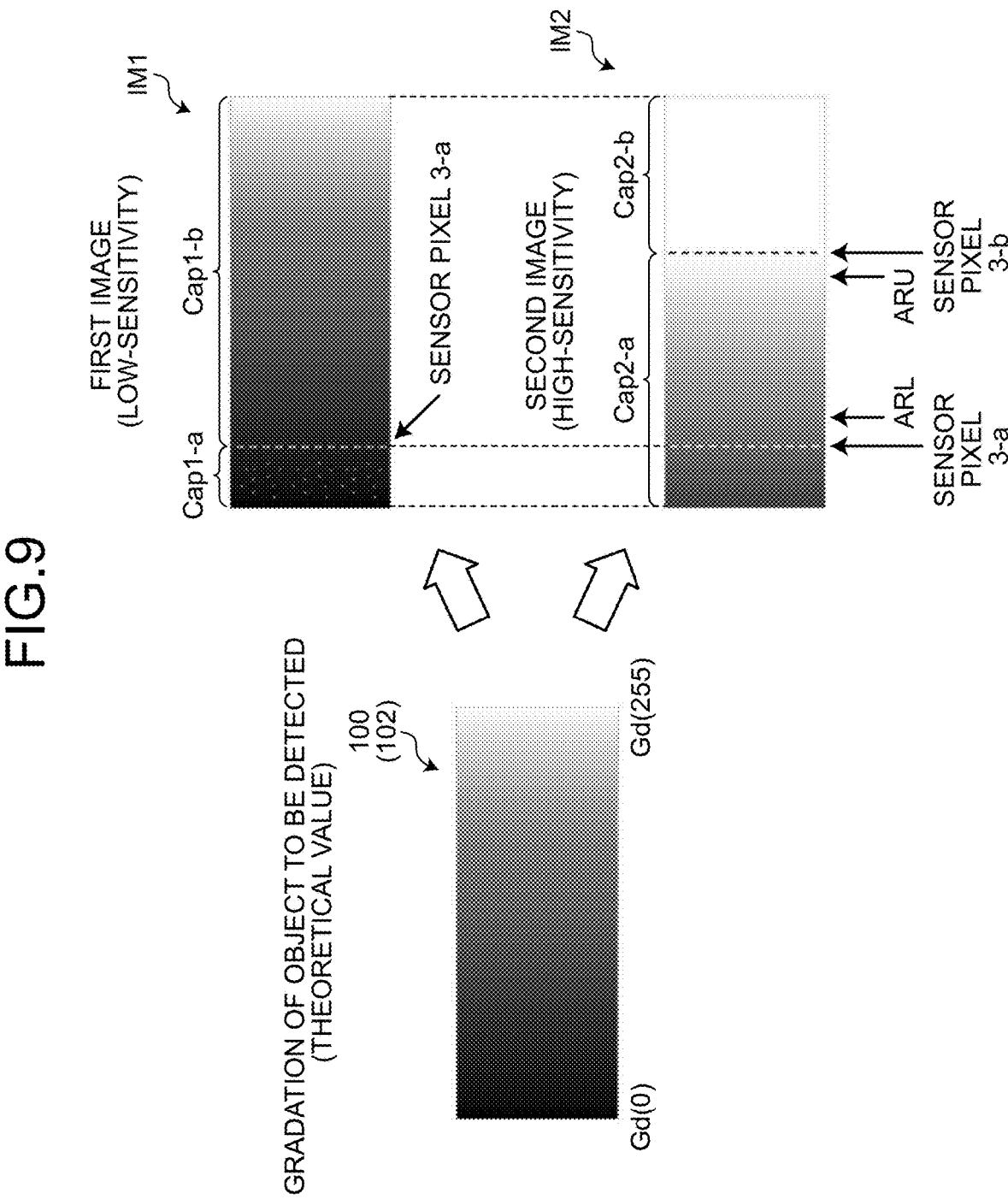
FIG. 9 is an explanatory diagram for explaining exemplary thresholds of pixel data.

The following describes one example of a detection method of the detection device 1 according to the present embodiment. FIG. 7 is an explanatory diagram for schematically explaining the method for generating the composite image using the low-sensitivity first image and the high-sensitivity second image. FIG. 8 is a timing waveform diagram for explaining an operation example of the detection device according to the first embodiment. FIG. 9 is an explanatory diagram for explaining examples of the thresholds of the pixel data.

As illustrated in FIG. 7, the optical sensor 10 captures the low-sensitivity first image IM1 and the second image IM2 that is more sensitive than the first image IM1. For the sake of clarity of explanation, FIG. 7 explains a case where three objects to be detected 100A, 100B, and 100C and the culture medium 102 are captured as each of the first and the second images IM1 and IM2. In the following description, the objects to be detected 100A, 100B, and 100C will each be simply referred to as the object to be detected 100 when need not be distinguished from one another.

The detection device 1 acquires the first and the second images IM1 and IM2 having different sensitivity by imaging the same object to be detected 100 and the culture medium 102 while changing the light intensity of the light sources 82. Specifically, as illustrated in FIG. 8, the detection device 1 has the detection period T1 to acquire the first image IM1 and the detection period T2 to acquire the second image IM2. In the example illustrated in FIG. 8, the detection period T1 is divided into a plurality of detection periods T1-1, T1-2, and T1-3, and the light sources 82 are turned on in a time-divisional manner for each of the detection periods T1-1, T1-2, and T1-3. In the same manner, the detection period T2 is divided into a plurality of detection periods T2-1, T2-2, and T2-3, and the light sources 82 are turned on in a time-division manner for each of the detection periods T2-1, T2-2, and T2-3.

The light sources 82 emit light at a first light intensity in the detection period T1. The optical sensor 10 scans the photodiodes 30 and performs detection of the objects to be detected 100 and the culture medium 102 based on the light at the first light intensity.

Specifically, the gate line drive circuits 15A and 15B of the optical sensor 10 sequentially scan from a sensor gate line GLS-1 in the first row to a sensor gate line GLS-m in the last row based on the control signal from the host IC 70. Thus, the optical sensor 10 scans the photodiodes 30 on the entire surface of the detection area AA. The photodiodes 30 output the detection signals Vdet corresponding to the first light intensity emitted from the light sources 82. The detection control circuit 11 processes the detection signals Vdet from the photodiodes 30 and outputs the first pixel data Cap1. Thus, the detection device 1 captures the low-sensitivity first image IM1 containing the first pixel data Cap1 in the detection period T1.

The light sources 82 emit light at a second light intensity larger than the first light intensity in the detection period T2. The optical sensor 10 scans the photodiodes 30 and performs detection of the objects to be detected 100 and the culture medium 102 based on the light at the second light intensity.

Specifically, the optical sensor 10 scans the photodiodes 30 on the entire surface of the detection area AA, in the same manner as in the detection period T1. The photodiodes 30 output the detection signals Vdet corresponding to the second light intensity emitted from the light sources 82. The detection control circuit 11 processes the detection signals Vdet from the photodiodes 30 and outputs the second pixel data Cap2. Thus, the detection device 1 captures the second image IM2 that contains the second pixel data Cap2 and is more sensitive than the first image IM1 in the detection period T2.

In the present embodiment, the light at the second light intensity emitted by the light sources 82 in the detection period T2 has higher luminance than the light at the first light intensity in the detection period T1. However, the present invention is not limited to this configuration. At least either of the luminance and the irradiation time of the light sources 82 of the light at the second light intensity is greater than in the case of the light at the first light intensity. Specifically, in the case of the light at the second light intensity, the irradiation time may be longer and the exposure time of the photodiodes 30 may be longer than in the case of the light at the first light intensity. Alternatively, in the case of the light at the second light intensity, the luminance may be higher, and in addition, the irradiation time may be longer and the exposure time of the photodiodes 30 may be longer than in the case of the light at the first light intensity.

The timing waveform diagram illustrated in FIG. 8 is only schematically illustrated and can be changed as appropriate. For example, the detection device 1 only needs to perform the detection at least once (for one frame) in each of the detection periods T1 and T2. In FIG. 8, the low-sensitivity first image IM1 is captured in the detection period T1, and then, the high-sensitivity second image IM2 is captured in the detection period T2. However, the first and the second images IM1 and IM2 may be captured in any order. For example, the high-sensitivity second image IM2 may be captured in the detection period T1, and then, the low-sensitivity first image IM1 may be captured in the detection period T1, or these images may be captured alternately in a time-divisional manner.

Referring back to FIG. 7, the first image IM1 includes a plurality of pieces of first pixel data Cap1-1, Cap1-2, Cap1-3, and Cap1-4. The first pixel data Cap1-1, Cap1-2, Cap1-3, and Cap1-4 are detected based on the light at the first light intensity, and correspond to the culture medium 102 and the objects to be detected 100A, 100B, and 100C, respectively. The first pixel data Cap1-1, Cap1-2, Cap1-3, and Cap1-4 have different gradations from one another.

The second image IM2 includes a plurality of pieces of second pixel data Cap2-1, Cap2-2, Cap2-3, and Cap2-4. The second pixel data Cap2-1, Cap2-2, Cap2-3, and Cap2-4 are detected based on the light at the second light intensity, and correspond to the culture medium 102 and the objects to be detected 100A, 100B, and 100C, respectively. The gradations of the second pixel data Cap2-1, Cap2-2, Cap2-3, and Cap2-4 differ from those of the first pixel data Cap1-1, Cap1-2, Cap1-3, and Cap1-4 of the first image IM1. More specifically, the gradations of the second pixel data Cap2-1, Cap2-2, Cap2-3, and Cap2-4 are larger than those of the first pixel data Cap1-1, Cap1-2, Cap1-3, and Cap1-4 of the first image IM1.

In the low-sensitivity first image IM1, the detection intensity of the photodiode 30 is smaller and noise may be generated in a low-gradation (black display) portion (for example, in the first pixel data Cap1-4 corresponding to the object to be detected 100C). In contrast, in the high-sensitivity second image IM2, the detection intensity of the photodiode 30 is saturated and the object to be detected 100A may not be detected in high-gradation (white display) portions (for example, in the second pixel data Cap2-1 and Cap2-2 corresponding to the culture medium 102 and the object to be detected 100A).

The detection device 1 of the present embodiment performs image analysis of the first and the second images IM1 and IM2, and calculates a conversion coefficient RCnv used to combine the first image IM1 with the second image IM2. In the image analysis, the arithmetic circuit 72 selects the second pixel data Cap2 within a range from the second threshold ARL to the first threshold ARU in the second image IM2, as an analysis target. That is, the arithmetic circuit 72 selects the second pixel data Cap2 corresponding to an area in the low-sensitivity first image IM1 where no noise is generated and an area in the high-sensitivity second image IM2 where the detection intensity of the photodiode 30 is not saturated.

In the example illustrated in FIG. 7, the areas in the low-sensitivity first image IM1 where no noise is generated are areas corresponding to the culture medium 102 and the objects to be detected 100A and 100B. The areas in the high-sensitivity second image IM2 where the detection intensity of the photodiode 30 is not saturated are areas corresponding to the objects to be detected 100B and 100C.

The arithmetic circuit 72 selects the second pixel data Cap2-3 corresponding to the object to be detected 100B in the second image IM2 as the area in the low-sensitivity first image IM1 where no noise is generated and the area in the high-sensitivity second image IM2 where the detection intensity of the photodiode 30 is not saturated, thus selecting the second pixel data Cap2-3 as the analysis target. In other words, the arithmetic circuit 72 deselects an area in the low-sensitivity first image IM1 corresponding to the object to be detected 100C where noise is generated, that is, the second pixel data Cap2-4 in the second image IM2. The arithmetic circuit 72 also deselects the second pixel data Cap2-1 and Cap2-2 in the high-sensitivity second image IM2 that correspond to the culture medium 102 and the object to be detected 100A where the detection intensity of the photodiode 30 is saturated.

The arithmetic circuit 72 calculates a gradation ratio R between the second pixel data Cap2-3 and the first pixel data Cap1-3 for each of the sensor pixels 3 in an area corresponding to the object to be detected 100B serving as the analysis target. The gradation ratio R is calculated as R=Cap1/Cap2. The arithmetic circuit 72 then calculates the average value of the gradation ratios R of the sensor pixels 3 as the conversion coefficient RCnv.

Then, the arithmetic circuit 72 generates the composite image IM-C by combining the first image IM1 with the second image IM2 using the conversion coefficient RCnv. Specifically, the arithmetic circuit 72 selects the second pixel data Cap2-3 and Cap2-4 (areas corresponding to the objects to be detected 100B and 100C) having gradations equal to or smaller than the predetermined first threshold ARU in the second image IM2. The second pixel data Cap2-1 and Cap2-2 (areas corresponding to the culture medium 102 and the object to be detected 100A) each having a larger gradation than the first threshold ARU are deselected.

The arithmetic circuit 72 calculates composite pixel data Comp(3) and Comp(4) by multiplying the second pixel data Cap2-3 and Cap2-4 selected in the second image IM2 by the conversion coefficient RCnv.

The arithmetic circuit 72 selects the first pixel data Cap1-1 and Cap1-2 in the first image IM1 as composite pixel data Comp(1) and Comp(2) in the areas corresponding to the deselected second pixel data Cap2-1 and Cap2-2 (the culture medium 102 and the object to be detected 100A).

The image generation circuit 76 (refer to FIG. 2) generates the composite image IM-C based on the composite pixel data Comp(3) and Comp(4) and the composite pixel data Comp(1) and Comp(2). In other words, the image generation circuit 76 generates the composite image IM-C based on the second pixel data Cap2-3 and Cap2-4 selected in the second image IM2 and the first pixel data Cap1-1 and Cap1-2 selected in the first image IM1.

The first threshold ARU and the second threshold ARL are set, for example, by the method illustrated in FIG. 9. The left diagram of FIG. 9 is a schematic diagram sequentially arranging the gradations (theoretical values) of the object to be detected 100 (including the culture medium 102) from a low gradation Gd(0) to a high gradation Gd(255) for each of the sensor pixels 3. The first and the second images IM1 and IM2 illustrated in the right diagram of FIG. 9 illustrate the gradations of the pixel data Cap captured at different light intensities of the light sources 82 in an array corresponding to the sensor pixels 3 having the theoretical values illustrated in the left diagram of FIG. 9. The first pixel data Cap1 of the first image IM1 is shifted toward the low-gradation side compared with the theoretical value. The second pixel data Cap2 of the second image IM2 is shifted toward the high-gradation side compared with the theoretical value.

In the first image IM1, first pixel data Cap1-*a* on the low-gradation side is an area where noise is generated. No noise is generated in first pixel data Cap1-*b* on the high-gradation side. In the array of the sensor pixels 3 in FIG. 9, a sensor pixel 3-*a* is the sensor pixel 3 located on the rightmost side of the sensor pixels 3 where noise is generated. That is, no noise is generated at the sensor pixels 3 on the right side of the sensor pixel 3-*a*.

In the second image IM2, the second threshold ARL is set to a gradation obtained by adding a margin of several gradations from a gradation corresponding to the rightmost sensor pixel 3-*a* in the area where noise is generated.

In the second image IM2, the detection intensity of the photodiode 30 does not saturate in second pixel data Cap2-*a* on the low-gradation side, and the gradation of the second pixel data Cap2 can be detected well. In second pixel data Cap2-*b* on the high-gradation side, the detection intensity of the photodiode 30 saturates, and the gradation of the second pixel data Cap2 cannot be detected (entirely displayed in white). In the array of the sensor pixels 3 in FIG. 9, a sensor pixel 3-*b* is the sensor pixel 3 located at the leftmost side of the sensor pixels 3 where the detection intensity of the photodiode 30 saturates, and the second pixel data Cap2 is the maximum gradation.

In the second image IM2, the first threshold ARU is set to a gradation obtained by subtracting a margin of several gradations from a gradation of the leftmost sensor pixel 3-*b* that has the maximum gradation.

The first threshold ARU and the second threshold ARL are determined at the time of designing the detection device 1 and stored in advance in the threshold storage circuit 73 (refer to FIG. 2). The magnitude of the margin in setting the first threshold ARU and the second threshold ARL is set for each detection device 1 according to variations in detection sensitivity of the photodiodes 30 and variations in light intensity of the light sources 82.

The following describes a more detailed method for generating the composite image IM-C with reference to FIG. 10. FIG. 10 is a flowchart illustrating the method for generating the composite image by the detection device according to the first embodiment. FIG. 10 does not illustrate the steps for capturing the low-sensitivity first image IM1 and the high-sensitivity second image IM2 described with reference to FIGS. 7 and 8. In FIG. 10, the first image IM1 containing the first pixel data Cap1 and the second image IM2 containing the second pixel data Cap2 are stored in advance in the pixel data storage circuit 71 of the host IC 70.

As illustrated in FIG. 10, the host IC 70 sets an analysis target pixel number n so that n=0 (Step ST1).

The host IC 70 then sets a sensor pixel number p so that p=1 (Step ST2).

The arithmetic circuit 72 acquires the second pixel data Cap2(*p*) in the second image IM2 from the pixel data storage circuit 71, and determines whether the second pixel data Cap2(*p*) is within the range from the second threshold ARL to the first threshold ARU (Step ST3).

If the second pixel data Cap2(*p*) is within the range from the second threshold ARL to the first threshold ARU (Yes at Step ST3), the arithmetic circuit 72 selects the second pixel data Cap2(p) of the sensor pixel number p as the analysis target. The host IC 70 sets the analysis target pixel number n so that n=n+1 (Step ST4).

The arithmetic circuit 72 acquires the first pixel data Cap1(p) in the first image IM1 corresponding to the sensor pixel number p selected as the analysis target, and calculates the gradation ratio R (n) (Step ST5). The gradation ratio R (n) is the ratio of the first pixel data Cap1(p) in the low-sensitivity first image IM1 to the second pixel data Cap2(p) in the high-sensitivity second image IM2, and is calculated based on Expression (1) below.

$$R(n) = (Cap1(p))/(Cap2(p)) \tag{1}$$

If the second pixel data Cap2(p) is not within the range from the second threshold ARL to the first threshold ARU (No at Step ST3), the arithmetic circuit 72 deselects the second pixel data Cap2(p) of the sensor pixel number p as the analysis target. In this case, the host IC 70 skips Steps ST4 and ST5 and proceeds to Step ST6.

The host IC 70 then determines whether the sensor pixel number p is the final value (Step ST6). If the sensor pixel number p is not the final value (No at Step ST6), the host IC 70 updates the sensor pixel number p so that p=p+1 (Step ST7), and performs the calculations from Step ST3 to Step ST5 for all the sensor pixel numbers p.

If the sensor pixel number p is the final value (Yes at Step ST6), the host IC 70 determines whether the analysis target pixel number n is such that n>0 (Step ST8). That is, the host IC 70 determines whether the second pixel data Cap2(p) selected as the analysis target at Step ST3 is present.

If the analysis target pixel number n is such that n>0 (Yes at Step ST8), the arithmetic circuit 72 calculates the conversion coefficient RCnv based on Expression (2) below (Step ST9). In Expression (2), R (n) is the gradation ratio R (n) obtained by Expression (1). As expressed in Expression (2), the conversion coefficient RCnv is the average value of the gradation ratios R (n).

$$RCnv = \frac{\sum_{i=1}^{n} R(i)}{n} \tag{2}$$

If the analysis target pixel number n is not such that n>0 (No at Step ST8), that is, if no second pixel data Cap2(p) is selected as the analysis target at Step ST3, the arithmetic circuit 72 sets the conversion coefficient RCnv to a standard conversion ratio Rdef (Step ST10). The standard conversion ratio Rdef is determined at the time of designing the detection device 1 and stored in advance in a storage circuit (for example, the threshold storage circuit 73 (refer to FIG. 2)).

The host IC 70 then sets the sensor pixel number p so that p=1 (Step ST11).

The arithmetic circuit 72 acquires the second pixel data Cap2(p) in the second image IM2 from the pixel data storage circuit 71, and determines whether the second pixel data Cap2(p) is equal to or lower than the first threshold ARU (Step ST12).

If the second pixel data Cap2(p) is equal to or lower than the first threshold ARU (Yes at Step ST12), in other words, if the detection intensity of the photodiode 30 at the sensor pixel number p has not saturated, the arithmetic circuit 72 calculates the composite pixel data Comp(p) based on Expression (3) below (Step ST13). As expressed in Expression (3), for the sensor pixel 3 where the detection intensity of the photodiode 30 has not saturated, the composite pixel data Comp(p) is obtained by multiplying the second pixel data Cap2(p) by the conversion coefficient RCnv.

$$Comp(p) = Cap2(p) \times Rcnv \tag{3}$$

If the second pixel data Cap2(p) is higher than the first threshold ARU (No at Step ST12), in other words, if the detection intensity of the photodiode 30 at the sensor pixel number p has saturated, the arithmetic circuit 72 calculates the composite pixel data Comp(p) based on Expression (4) below (Step ST14). As expressed in Expression (4), for the sensor pixel 3 where the detection intensity of the photodiode 30 has saturated, the composite pixel data Comp(p) is set to the first pixel data Cap1(p) in the first image IM1, without using the second pixel data Cap2(p).

$$Comp(p) = Cap1(p) \tag{4}$$

The host IC 70 then determines whether the sensor pixel number p is the final value (Step ST15). If the sensor pixel number p is not the final value (No at Step ST15), the host IC 70 updates the sensor pixel number p so that p=p+1 (Step ST16), and performs the calculation of the composite pixel data Comp(p) from Step ST12 to Step ST14 for all the sensor pixel numbers p.

If the sensor pixel number p is the final value (Yes at Step ST15), the image generation circuit 76 generates the composite image IM-C using the composite pixel data Comp(p) (Step ST17).

The method described above allows the detection device 1 according to the first embodiment to generate the composite image IM-C based on the first pixel data Cap1 selected in the first image IM1 and the second pixel data Cap2 selected in the second image IM2.

As a result, the detection device 1 can generate the composite image IM-C where the gradation is well expressed from the low-gradation side to the high-gradation side by reducing the generation of noise on the low-gradation side in the low-sensitivity first image IM1 and restraining the saturation of the detection intensity of the photodiode 30 in the high-sensitivity second image IM2. As illustrated from Step ST12 to Step ST14, the composite pixel data Comp is calculated using mainly the high-sensitivity second image IM2. As a result, the high-sensitivity composite image IM-C can be generated.

In the present embodiment, the conversion coefficient RCnv is calculated using the first pixel data Cap1 of the first image IM1 and the second pixel data Cap2 of the second image IM2, and the composite pixel data Comp is generated by multiplying the selected second pixel data Cap2 by the conversion coefficient RCnv. As a result, the composite image IM-C can be restrained from deteriorating in image quality compared with a case of simply combining images having different sensitivities, or a case of combining a plurality of images using coefficients uniquely set in advance.

The flow illustrated in FIG. 10 is merely exemplary and can be changed as appropriate. For example, the calculation of the gradation ratio R (n) at Step ST5 is not limited to using the first pixel data Cap1 and the second pixel data Cap2 as they are, but may use data obtained by subtracting (or adding) a predetermined offset value from (or to) the first pixel data Cap1 and the second pixel data Cap2.

Second Embodiment

Figure 11:
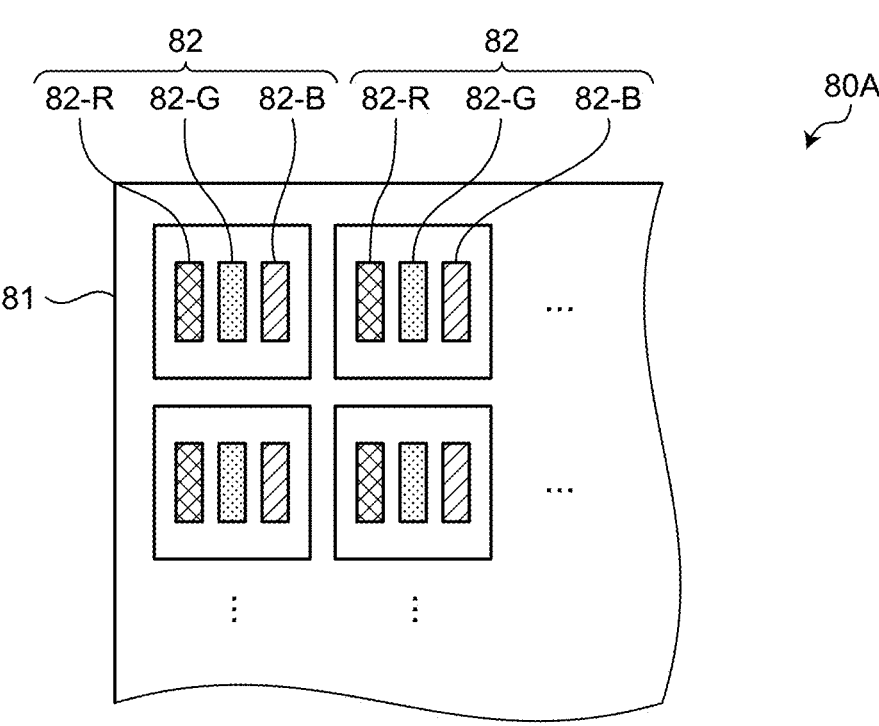
FIG. 11 is a plan view schematically illustrating a configuration example of a plurality of light sources of the detection device according to a second embodiment of the present invention.
Figure 12:
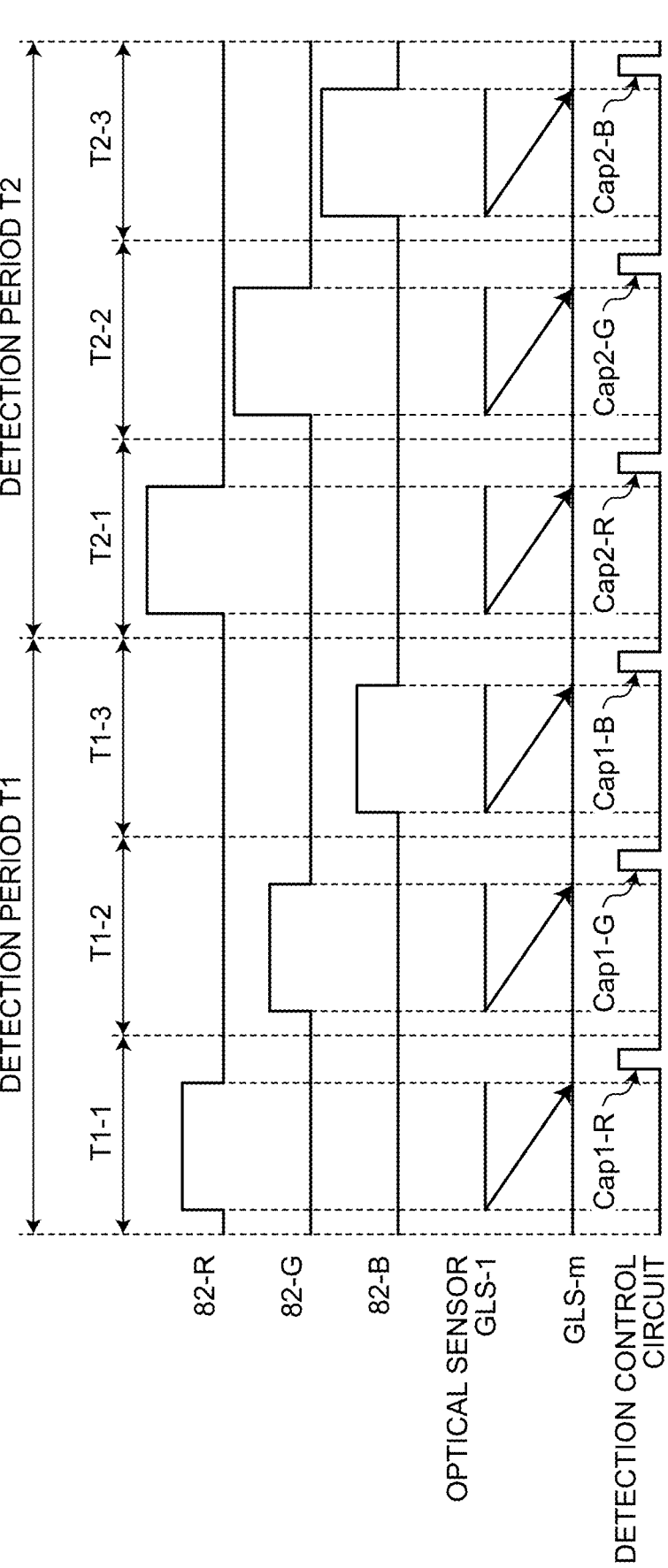
FIG. 12 is a timing waveform diagram for explaining an operation example of the detection device according to the second embodiment.

FIG. 11 is a plan view schematically illustrating a configuration example of the light sources of the detection device according to a second embodiment of the present invention. FIG. 12 is a timing waveform diagram for explaining an operation example of the detection device according to the second embodiment. In the following description, the same components as those described in the embodiment above are denoted by the same reference numerals, and the description thereof will not be repeated.

As illustrated in FIG. 11, in a light source device 80A according to the second embodiment, the light sources 82 each include light sources 82-R, 82-G, and 82-B. The light source 82-R (first light source) emits red light. The light source 82-G (second light source) emits green light. The light source 82-B (third light source) emits blue light. The light sources 82-R, 82-G, and 82-B are arranged to be lined up in this order. However, the arrangement of the light sources 82-R, 82-G, and 82-B is not limited to this arrangement, and can be changed as appropriate. The light sources 82 may be configured with four or more colors.

As illustrated in FIG. 12, the light sources 82-R, 82-G, and 82-B are turned on in a time-division manner in the detection period T1. In more detail, the detection period T1 is divided into the detection periods T1-1, T1-2, and T1-3, and the light sources 82-R, 82-G, and 82-B are turned on to emit light at the first light intensity in a time-division manner for each of the detection periods T1-1, T1-2, and T1-3, respectively.

The detection control circuit 11 processes the detection signals Vdet from the photodiodes 30 for each of the detection periods T1-1, T1-2, and T1-3 to output first pixel data Cap1-R, Cap1-G, and Cap1-B corresponding to the respective colors.

In the detection period T2, the light sources 82-R, 82-G, and 82-B are turned on to emit light at the second light intensity larger than the first light intensity in a time-division manner for each of the detection periods T2-1, T2-2, and T2-3, respectively.

The detection control circuit 11 processes the detection signals Vdet from the photodiodes 30 for each of the detection periods T2-1, T2-2, and T2-3 to output second pixel data Cap2-R, Cap2-G, and Cap2-B corresponding to the respective colors.

Thus, in the second embodiment, the detection device 1 captures the first image IM1 corresponding to each of the red light, the green light, and the blue light based on the first pixel data Cap1-R, Cap1-G, and Cap1-B, respectively. The detection device 1 also captures the second image IM2 corresponding to each of the red light, the green light, and the blue light based on the second pixel data Cap2-R, Cap2-G, and Cap2-B, respectively.

Although not illustrated, in the second embodiment, the calculation of the gradation ratio R (n) and the conversion coefficient RCnv for each color illustrated from Step ST3 to Step ST10 in FIG. 10 and the calculation of the composite pixel data Comp illustrated from Step ST12 to Step ST14 are performed for all the sensor pixels 3.

In the present embodiment, a conversion coefficient RCnv-R corresponding to the red light, a conversion coefficient RCnv-G corresponding to the green light, and a conversion coefficient RCnv-B corresponding to the blue light are calculated at Step ST9 in FIG. 10. Then, the average value of the conversion coefficients RCnv-R, RCnv-G, and RCnv-B corresponding to red, green, and blue (RGB), respectively, is calculated as the conversion coefficient RCnv based on Expression (5) below.

$$RCnv = (RCnv-R, RCnv-G, RCnv-B)/3 \qquad (5)$$

Using the conversion coefficient RCnv obtained by Expression (5), the composite pixel data Comp corresponding to respective RGB colors can be calculated, and the composite image IM-C of a color image can be generated in the same manner as in the first embodiment.

Modification of Second Embodiment

Figure 13:
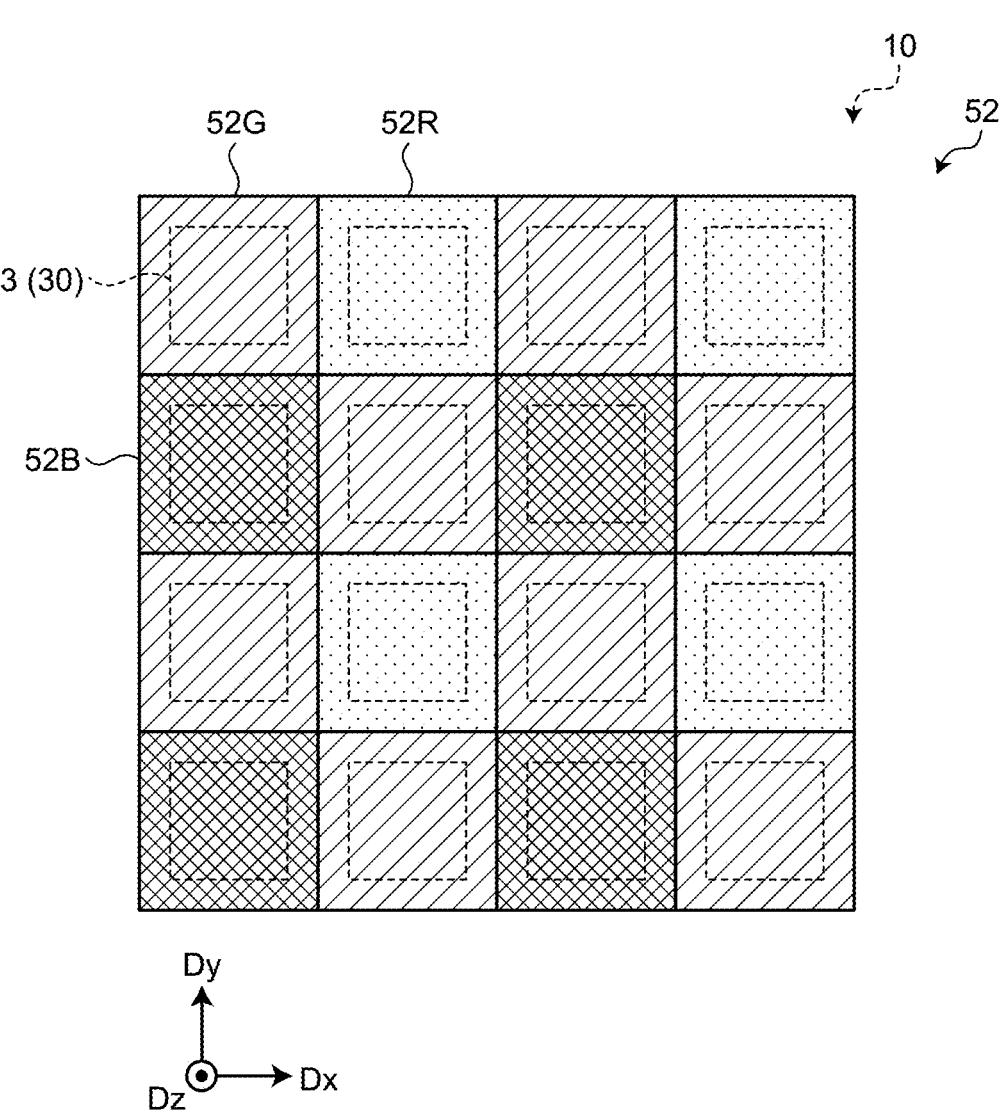
FIG. 13 is a plan view schematically illustrating an optical sensor and a color filter of the detection device according to a modification of the second embodiment.

FIG. 13 is a plan view schematically illustrating the optical sensor and a color filter of the detection device according to a modification of the second embodiment. In the second embodiment described above, the configuration provided with the light sources 82-R, 82-G, and 82-B for capturing the color image has been described, but the present disclosure is not limited to this configuration. As illustrated in FIG. 13, the detection device 1 according to the modification of the second embodiment includes a color filter 52 provided on the optical sensor 10.

The color filter 52 includes, for example, a color filter 52R that transmits red light, a color filter 52G that transmits green light, and a color filter 52B that transmits green light. As the color filters 52R, 52B, and 52G, filters in different colors are arranged for the respective sensor pixels 3 (photodiodes 30).

For example, in the example illustrated in FIG. 13, the color filters 52R and 52G are alternately arranged in the first direction Dx correspondingly to the sensor pixels 3 in the first row arranged in the first direction Dx. In addition, the color filter 52B and 52G are alternately arranged in the first direction Dx correspondingly to the sensor pixels 3 in the second row. In the second direction Dy, the color filters 52R and 52G are adjacent to each other, and the color filters 52B and 52G are adjacent to each other.

In the modification, the light sources 82 of the light source device 80 emit white light. The light emitted from light sources 82 in a color corresponding to each of the color filters 52R, 52B, and 52G enters the photodiode 30 of the optical sensor 10. The photodiode 30 overlapping the color filter 52R outputs the detection signal Vdet corresponding to the red light. The photodiode 30 overlapping the color filter 52G outputs the detection signal Vdet corresponding to the green light. The photodiode 30 overlapping the color filter 52B outputs the detection signal Vdet corresponding to the blue light.

The detection control circuit 11 processes the detection signals Vdet from the photodiodes 30, and outputs the first pixel data Cap1-R, Cap1-G, and Cap1-B and the second pixel data Cap2-R, Cap2-G, and Cap2-B corresponding to the respective colors for the respective sensor pixels 3. As a result, the detection device 1 according to the modification can generate the composite image IM-C of the color image in the same manner as in the second embodiment described above. In the modification of the second embodiment, the influence of the adjacent light sources 82 can be reduced by making different the colors of the adjacent color filters 52R, 52B, 52G and the adjacent light sources 82-R, 82-G, 82-B.

The configuration of the color filter 52 illustrated in FIG. 13 is merely exemplary and can be changed as appropriate.

For example, the color filters 52R, 52G, and 52B may be arranged to be lined up in this order in the first direction Dx. The color filter 52 is not limited to three colors, and may have four or more colors.

Third Embodiment

Figure 14:
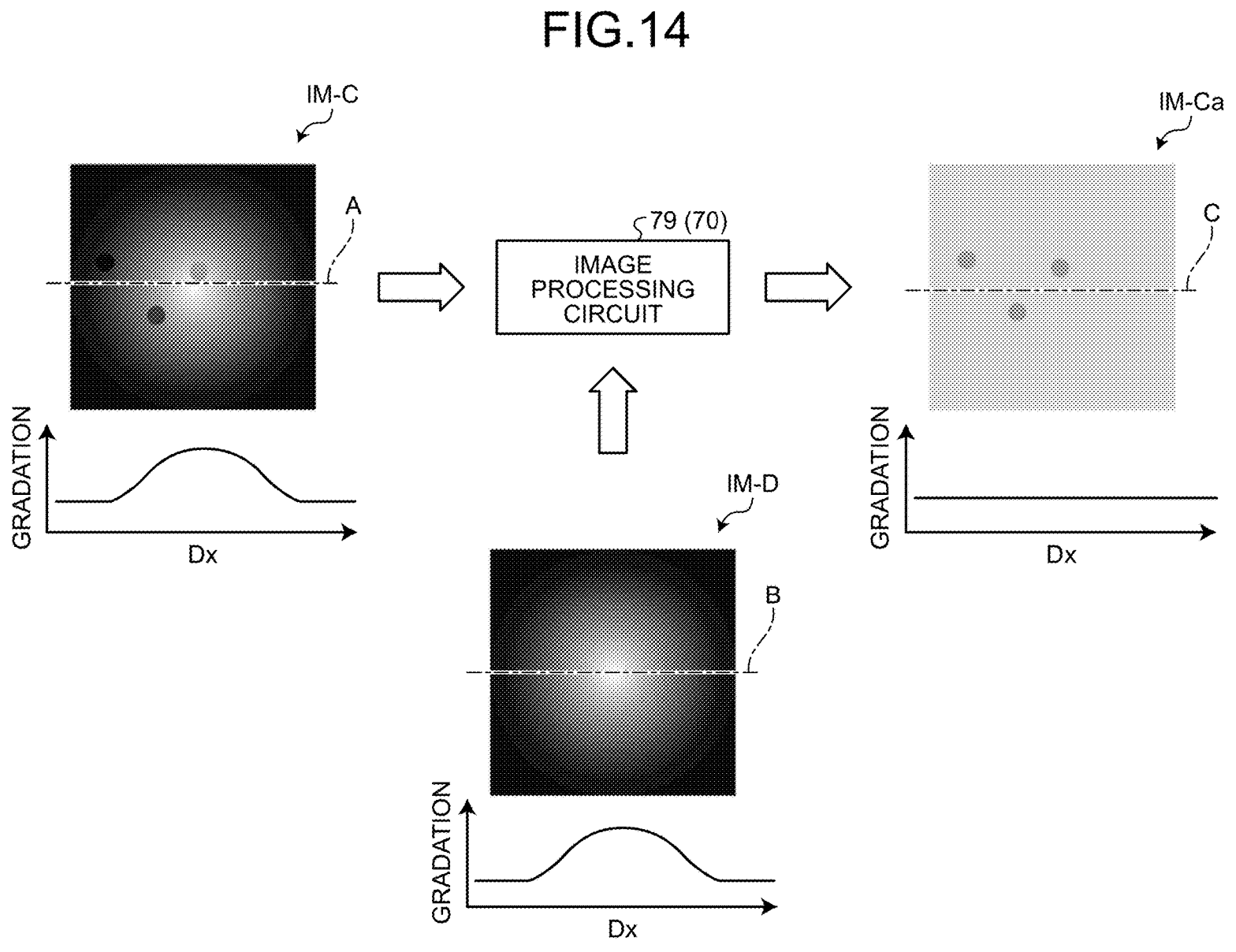

FIG. 14 is an explanatory diagram for explaining a method for correcting luminance of the composite image by the detection device according to a third embodiment of the present invention. FIG. 14 schematically illustrates gradation distributions along long dashed short dashed lines A, B, and C for the composite image IM-C (left diagram of FIG. 14), luminance gradient data IM-D (center diagram of FIG. 14), and a corrected composite image IM-Ca (right diagram of FIG. 14), respectively.

As illustrated in the left diagram of FIG. 14, the composite image IM-C generated at Step ST17 (refer to FIG. 10) may have a distribution of gradation depending on the distance from the light sources 82. For example, the composite image IM-C in an area corresponding to one of the light sources 82 is brighter at locations closer to the center of the composite image IM-C, that is, the center of the light source 82, and darker at the periphery of the composite image IM-C, that is, at locations farther from the center of the light source 82. In this case, the gradation varies depending on the position in the composite image IM-C, which may not allow the object to be detected 100 to be well detected.

In the detection device 1 according to the third embodiment, a storage circuit (for example, the threshold storage circuit 73) stores therein the luminance gradient data IM-D illustrated in the center diagram of FIG. 14. The luminance gradient data IM-D is information on the luminance depending on the distance from each of the light sources 82 in plan view. The luminance gradient data IM-D is the information obtained based on the composite image IM-C acquired for the mounting substrate 110 and the culture medium 102 when the object to be detected 100 is absent. The storage circuit (for example, the threshold storage circuit 73) also stores therein information on corrected values based on the luminance gradient data IM-D in advance. A corrected gradation Lc is calculated based on Expression (6) below and stored in the storage circuit (for example, the threshold storage circuit 73).

$$Lc(x) = (Ls(x)/Lp(x)) \times S \qquad (6)$$

In Expression (6), x denotes a pixel coordinate in the first direction Dx. Lc denotes the corrected gradation. Ls denotes the acquired gradation (composite pixel data Comp) acquired based on the composite image IM-C. Lp denotes a reference gradation distribution based on the luminance gradient data IM-D. S denotes an adjustment coefficient.

As illustrated in FIG. 14, the host IC 70 includes an image processing circuit 79. The image processing circuit 79 corrects the luminance of the composite image IM-C based on the luminance gradient data IM-D. In more detail, the image processing circuit 79 integrates the corrected gradation Lc stored in advance in the storage circuit (for example, the threshold storage circuit 73) into the composite image IM-C generated at Step ST17 (refer to FIG. 10) to obtain the corrected composite image IM-Ca (right diagram of FIG. 14). In the corrected composite image IM-Ca, the gradation distribution characteristics on the background are virtually constant regardless of the position, thus obtaining the gradations corresponding to the transmittance of the object to be detected 100 regardless of the position. The detection device 1 according to the third embodiment can improve the detection accuracy.

While the example of correcting the luminance of the composite image IM-C has been described with reference to FIG. 14, the correction of luminance is not limited to this example. The luminance of at least one of the first image IM1 and the second image IM2 may be corrected as necessary.

What is claimed is:

1. A detection device comprising:
   a light source; and
   an optical sensor comprising a plurality of photodiodes configured to output pixel data corresponding to a light intensity irradiating the photodiodes, wherein
   the optical sensor is configured to capture a first image containing a plurality of pieces of first pixel data and a second image that contains a plurality of pieces of second pixel data and is more sensitive than the first image,
   the second pixel data having a gradation equal to or smaller than a predetermined threshold is selected in the second image,
   the first pixel data in an area corresponding to a deselected second pixel data is selected in the first image,
   a composite image is generated based on the selected second pixel data and the selected first pixel data,
   the light source comprises a first light source configured to emit red light, a second light source configured to emit green light, and a third light source configured to emit blue light,
   the optical sensor is configured to capture the first image and the second image that correspond to each of the red light, the green light, and the blue light,
   the detection device is configured to:
      select the second pixel data corresponding to each of the red light, the green light, and the blue light; and
      generate the composite image using composite pixel data obtained by multiplying the selected second pixel data corresponding to each of the red light, the green light, and the blue light by a predetermined conversion coefficient, and
   the predetermined conversion coefficient is a value obtained as an average value of a conversion coefficient corresponding to the red light, a conversion coefficient corresponding to the green light, and a conversion coefficient corresponding to the blue light.

2. The detection device according to claim 1, wherein the light source is configured to emit light at a first light intensity and the optical sensor is configured to capture the first image in response to the light at the first light intensity, in a first detection period, and the light source is configured to emit light at a second light intensity larger than the first light intensity and the optical sensor is configured to capture the second image in response to the light at the second light intensity, in a second detection period.

3. The detection device according to claim 2, wherein the light at the second light intensity is greater than the light at the first light intensity in at least either of luminance and irradiation time of the light source.

4. The detection device according to claim 1, comprising:
   an arithmetic circuit configured to select the second pixel data in the second image and select the first pixel data in the first image; and an image generation circuit configured to generate the composite image, wherein the arithmetic circuit is configured to calculate composite pixel data by multiplying the selected second pixel data by the predetermined conversion coefficient, and the image generation circuit is configured to generate the composite image based on the composite pixel data and the selected first pixel data.

5. The detection device according to claim 1, comprising a light-transmitting mounting substrate located between the light source and the optical sensor in order to mount an object to be detected.

6. The detection device according to claim 1, wherein the light source is a point light source.

7. The detection device according to claim 1, comprising a storage circuit configured to store luminance gradient data depending on a distance from the light source to each of the photodiodes, and configured to correct luminance of the composite image based on the luminance gradient data.

* * * * *